United States Patent
Rinker

[15] 3,706,624
[45] Dec. 19, 1972

[54] APPARATUS FOR MAKING PLASTIC HOSE

[72] Inventor: William R. Rinker, Cuyahoga Falls, Ohio

[73] Assignee: The B.F. Goodrich Company, New York, N.Y.

[22] Filed: Jan. 21, 1969

[21] Appl. No.: 792,496

[52] U.S. Cl. .................156/432, 156/189, 156/192, 156/199, 156/195, 156/244, 156/450
[51] Int. Cl. .............................................B29d 27/00
[58] Field of Search......156/431, 432, 450, 184, 189, 156/195, 194, 244, 192

[56] References Cited

UNITED STATES PATENTS

| 3,300,355 | 1/1967 | Adams | 156/189 |
|---|---|---|---|
| 3,118,800 | 1/1964 | Snelling | 156/244 X |
| 3,112,895 | 12/1963 | Kinney | 156/189 X |
| 3,272,672 | 9/1966 | Lampman et al. | 156/189 |
| 3,321,357 | 5/1967 | Kennedy | 156/244 X |
| 3,399,095 | 8/1968 | Hyland | 156/244 X |
| 3,400,029 | 9/1968 | Mesrobian et al. | 156/244 X |
| 3,470,051 | 9/1969 | Meyer | 156/244 X |
| 3,477,891 | 11/1969 | Hawerkamp | 156/244 X |

Primary Examiner—Carl D. Quarforth
Assistant Examiner—G. G. Solyst
Attorney—W. A. Shira, Jr. and Harold S. Meyer

[57] ABSTRACT

An apparatus for making continuous reinforced plastic hose by extruding a ribbon of heated plastic, with portions having compositions of different stiffness, winding the ribbon in a continuous helix over two spaced rotating mandrels, and uniting adjacent pitches of the helix during the winding to form a continuous tube. In one embodiment, The mandrels are mutually skewed with one mandrel being power-rotated and the other free to rotate. In that embodiment, the hose is axially advanced by the axial component of rotation of the skewed mandrels. Another embodiment provides for winding of the ribbon over parallel mandrels with the free mandrel having longitudinally sequentially reciprocating slats to axially advance the tubing.

14 Claims, 8 Drawing Figures

INVENTOR.
WILLIAM R. RINKER

INVENTOR
WILLIAM R. RINKER

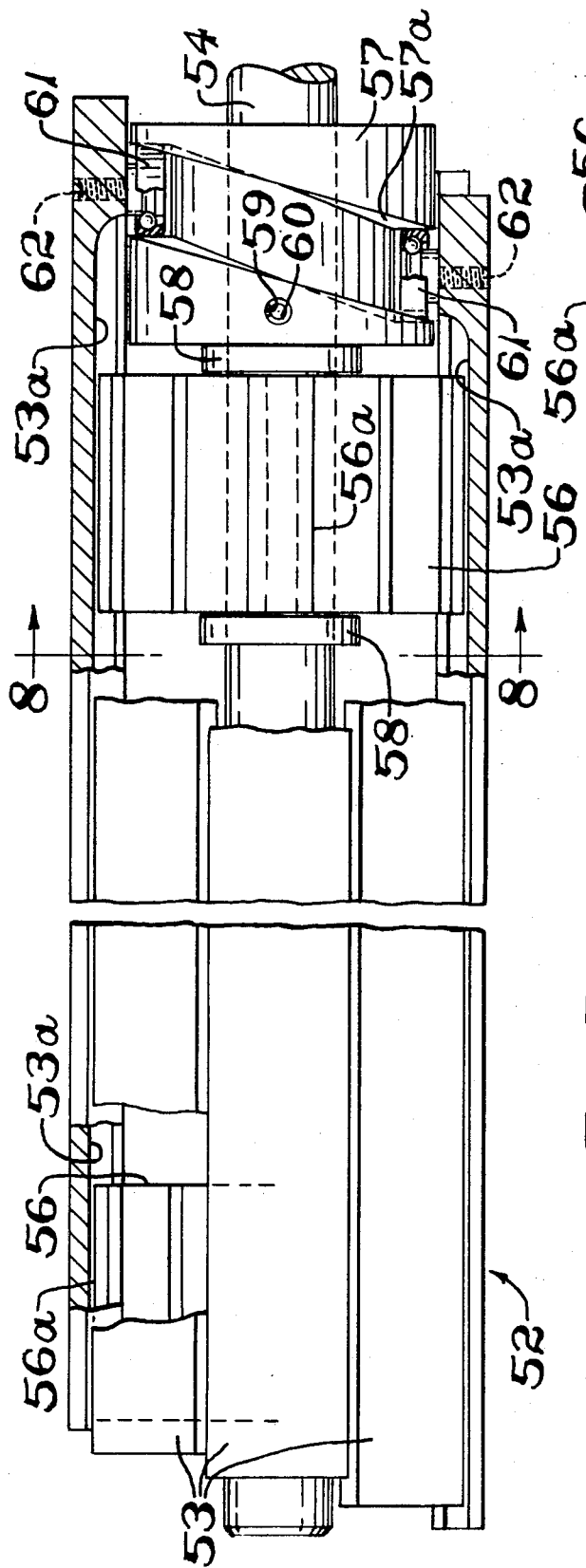
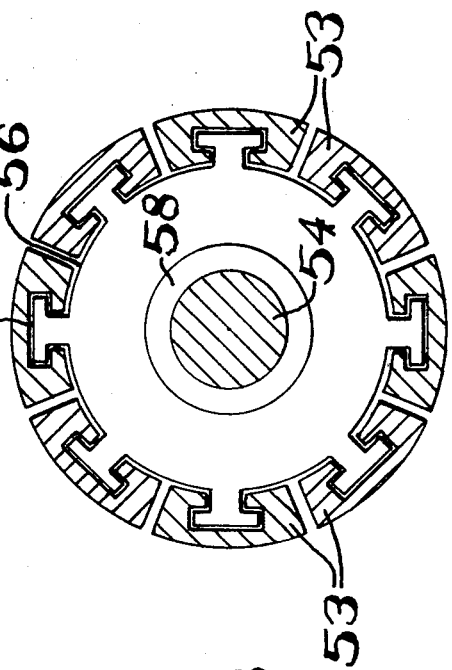
Fig. 7
Fig. 8

3,706,624

APPARATUS FOR MAKING PLASTIC HOSE

BACKGROUND OF THE INVENTION

Flexible plastic hose is commercially important in applications where fluid transmission is effected by means of suction or at moderate ranges of positive pressure and temperature. In order to provide plastic hose which is sufficiently flexible and light in weight for such applications, the hose is usually made of extruded construction having a wall thickness small compared to the hose diameter and with a spiral reinforcement which may be integrally imbedded in the hose wall.

One method of forming hose of this type is by extruding or spirally winding heated plastic over a mandrel substantially the size of the desired tubing. In this method, the length of the tubing is limited by the length of the mandrel over which the hose may be conveniently axially advanced during the forming. Moreover, it has been very difficult to advance the hose axially over the forming mandrel for any substantial length, due to the friction between the hose and the mandrel. These difficulties have severely restricted the maximum length to which light-weight plastic hose could be made.

A second method of forming reinforced plastic hose has employed a rotating die to which the ribbon of dual composition is fed. This method requires one or more rotary seals and other complexities of apparatus which are difficult to maintain in production.

SUMMARY OF THE INVENTION

The present invention provides a solution to the above described and other problems of prior methods of manufacturing by enabling the hose to be spirally wound from an extruded ribbon of heated plastic while the ribbon is helically wound over two spaced rotating mandrels. The plastic ribbon has a dual composition of materials having different stiffness integrally united. One of the mandrels is power-rotated while the second mandrel is free to rotate about its axis. In one embodiment, the mandrels are disposed in skewed arrangement and provide an axial component to the rotation of the hose and thereby feed the hose axially away from the point of winding of the extruded ribbon on the power-rotated mandrel. In another embodiment, the mandrels are disposed in parallel arrangement and the tubing is advanced by oscillating slats on the second mandrel.

The present invention enables, for the first time, production of continuous lengths of plastic hose on short mandrels with equipment which is simple in construction and easy to maintain in production. This is made possible by the propensity of the heated dual composition plastic ribbon, used in winding the hose, to assume a circular configuration upon axially extending beyond the ends of the spaced winding mandrels. The diameter of the hose is determined initially by the spacing of the mandrels over which the hose is wound, in an elongated-loop cross section, with the hose assuming circular cross section upon leaving the mandrels. This method overcomes the difficulties of axially advancing the hose over a single closely fitting mandrel or using the complex rotating die and rotary seals of the prior procedures.

BRIEF DESCRIPTION OF THE DRAWINGS

FIG. 7 is an enlarged view, partially in side elevation and partially in longitudinal section, showing details of the mechanism for oscillating the mandrel slats of the lower mandrel in the embodiment of FIG. 6; and FIG. 8 is a partial section taken along section indicating lines 8—8 of FIG. 7.

DETAILED DESCRIPTION

Figure 1:
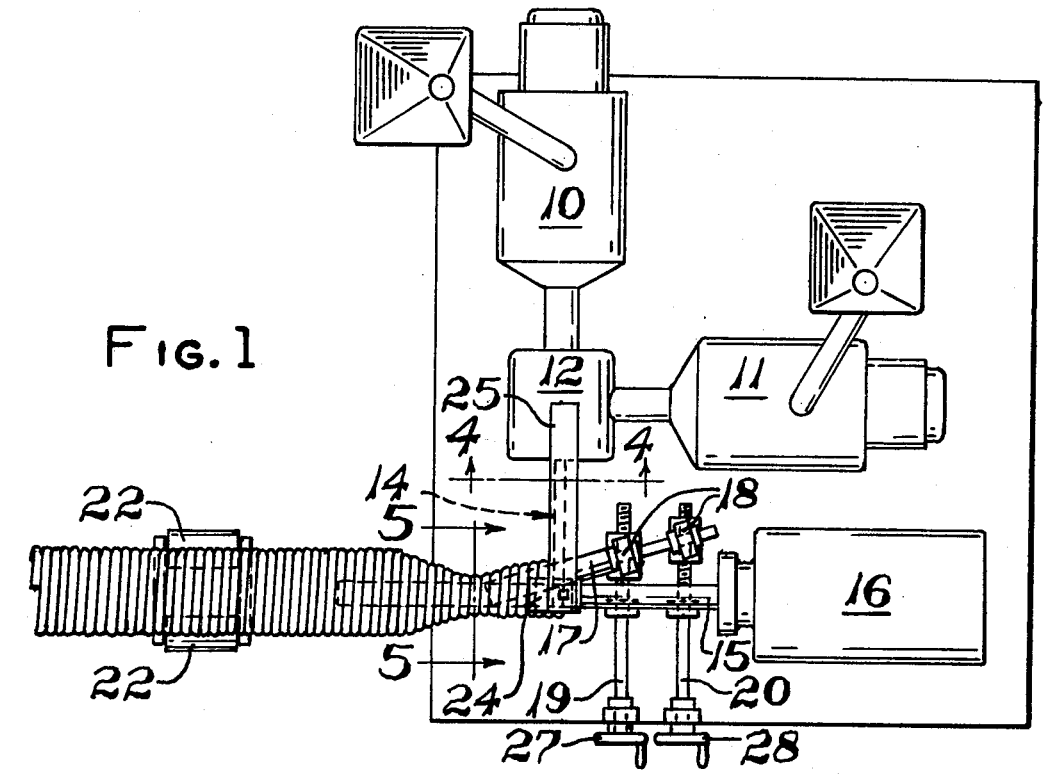
FIG. 1 is a plan view of hose being formed on the skewed-mandrel apparatus embodiment of the invention.

Referring now to FIGS. 1 to 5, the invention is shown, in its preferred form, as comprising a pair of extruders 10 and 11 provided for simultaneously extruding heated plastic of different compositions. The effluent of each extruder is fed into a cross-head die 12 having a common orifice 13 which provides an elongated effluent or ribbon 14 having a core 14a of stiffer, preferably unplasticized, material provided by the extruder 10, and an outer jacket 14b of plasticized material of lesser stiffness, provided by the extruder 11. The design and construction of the extruders 10 and 11 and die 12 may be of any convenient type known in the art of dual composition extrusion which will provide the desired ribbon configuration having the core of more rigid material encased in the less rigid material.

Figure 2:
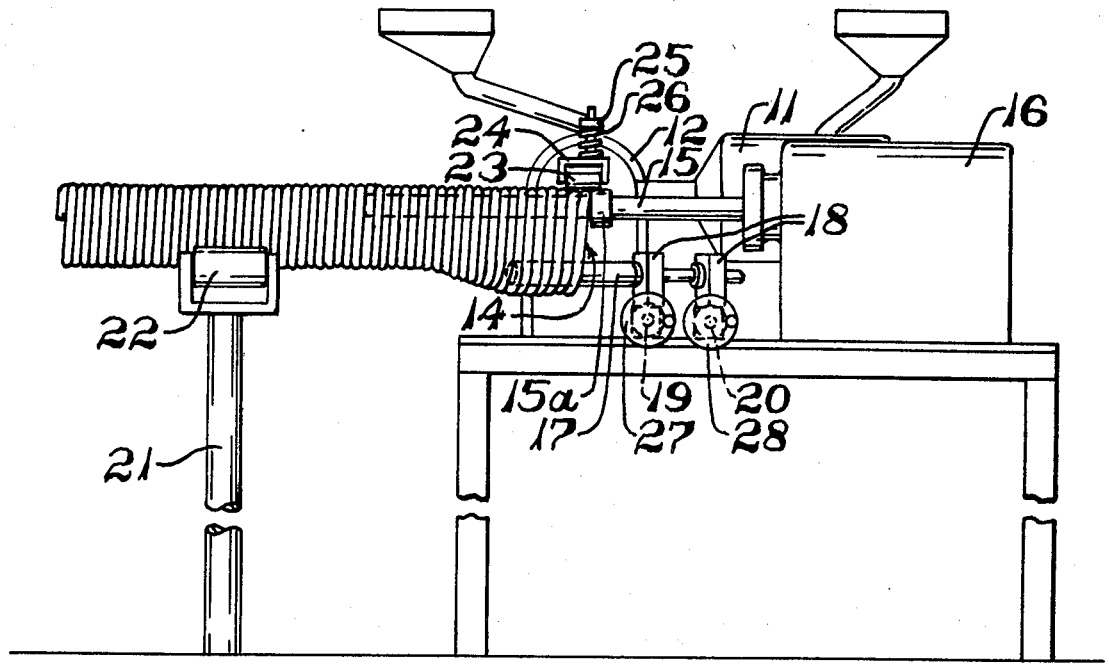
FIG. 2 is a side elevation view of the apparatus of FIG. 1 showing in more detail the extrusion and feeding of the plastic ribbon onto the first mandrel.

The ribbon 14 is fed continuously over a rotating mandrel 15 at substantially right angles to the mandrel. Mandrel 15 extends horizontally in cantilever and is power-rotated by motor means 16 which means preferably is variable in speed. In the embodiment of FIGS. 1 and 2, a second mandrel 17 is disposed skewed to mandrel 15 and has one end mounted in bearings in cantilever arrangement such that the mandrel 17 is free to rotate about its axis. Mandrel 17 is supported through bearings and has a pair of adjustment screws 19 and 20 which enable the angularity of mandrel 17 to be altered with respect to the first mandrel 15. The plastic ribbon 14 is initially fed over the first mandrel 15, which is rotated in a direction to lead the ribbon away from the extruding orifice 13, and the ribbon is continued over mandrel 17 and back again over mandrel 15. Thus, the ribbon forms a helical coil having an oval cross section over the two spaced mandrels. The adjacent axial edges of the ribbon are wound in mutual contact and unite to form a continuous hose on the mandrels by virtue of the elevated temperature of the plastic. As will be further explained, a pressure roller may also be employed to aid in uniting the adjacent pitches of the hose.

The diameter of the hose to be formed in determined initially by the spacing between mandrels 15 and 17 by changing the vertical height of the mounting frame 18 with respect to the first mandrel 15. The second mandrel 17 extends only a short distance, in the order of four hose diameters, axially beyond the point at which the plastic ribbon 14 first contacts mandrel 15. Thus, as the hose is formed by continuous oval helical winding, the hose feeds axially beyond the ends of the mandrel 15 and 17 and assumes a circular cross section upon leaving the ends of the mandrels. A support means 21, which is shown as comprising spaced rollers 22, is provided to maintain the finished hose in alignment with mandrel 15 to prevent sagging and distortion of the plastic hose until it has cooled, following the winding.

Figure 3:
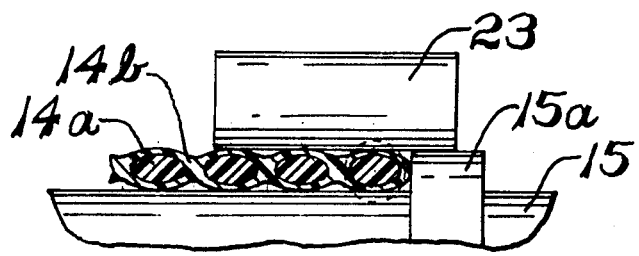
FIG. 3 is a fragmentary enlarged view of FIG. 2 showing the pressure roll in greater detail.
Figure 4:
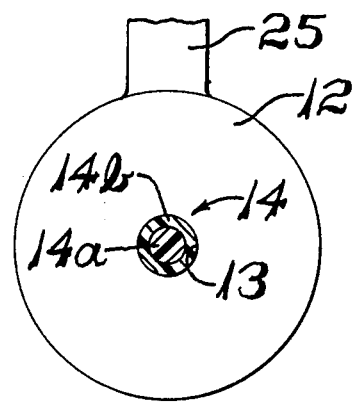
FIG. 4 is a partial sectional view taken along section indicating lines 4—4 of FIG. 1 and shows the details of the heated plastic ribbon effluent from the extruder.

As shown in FIG. 3, the pressure roller 23 is provided for shaping the exterior of the plastic ribbon and for aiding in axially uniting adjacent pitches of the helical winding. The pressure roller 23 is rotatably mounted on a fork 24 which is slidably mounted to a frame portion 25 extending from cross-head die 12. The roller is so positioned that a portion of it rides upon a step-ring or collar 15a, provided on mandrel 15, with the roller 23 urged into contact with the collar by a compression spring 26 between the fork 24 and frame portion 25. The collar and roller determine the maximum wall thickness of the tube and assist in uniting the adjacent convolutions thereof.

During the winding of the plastic ribbon 14 over the mandrels 15 and 17, control of the thickness of the jacket 14b of ribbon 14 may be maintained by varying the speed of rotation of mandrel 15 through the variable speed power means 16 while maintaining a uniform rate of extrusion. By varying the speed of rotation of mandrel 15, the tension in ribbon 14 is changed between mandrel 15 and extrusion die 13. Changing the tension in the ribbon 14 as it exits from the die orifice 13 causes thickening or thinning of the ribbon 14 which is thus caused to vary in thickness by virtue of changes in the tension as the speed of rotation of mandrel 15 is varied.

As the hose is helically formed over the mandrels, the axial component of force thereon resulting from the rotation of the skewed mandrel 17 causes the hose to feed axially along the mandrel 15 away from the point of winding. In addition to varying the winding speed, the rate of axial feed of the hose may be further controlled by varying the angularity between the first mandrel 15 and second mandrel 17. This is accomplished by burning hand wheels 27 and 28, respectively attached to the adjusting screws 19 and 20, which position the frame supporting the second mandrel 17 with respect to the first mandrel 15. As the angularity between mandrels 15 and 17 is increased, the axial feed is also increased, and similarly, as the angle is decreased so also is the axial feed of the hose.

In the preferred form of the invention, mandrel 15 need only be of sufficient length to support a convenient number of coils of hose winding to permit cooling of the plastic to a sufficiently rigid state to maintain its shape. In the preferred practice of the invention, this length generally does not exceed 10 hose diameters. In contrast, mandrel 17 need only be of the order of three or four hose diameters in length to provide uniformity to the coils immediately subsequent to the winding. As the hose feeds axially beyond the end of the second mandrel 17 it assumes a circular shape and is then supported internally, for a short distance beyond the end of the second mandrel 17, by the first mandrel 15. After leaving the end of mandrel 15, the hose passes over a support means, comprising rollers 22 and mounted on a stand 21. Any desired number of rollers 22 may be employed, or these may be replaced by an air levitation bed or other support means to facilitate manufacturing of very long lengths of hose and to provide support during additional cooling.

Figure 5:
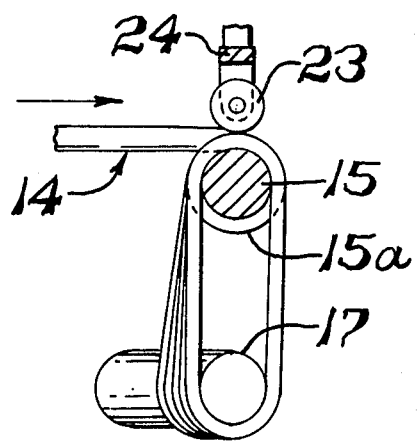
FIG. 5 is a partial sectional view taken along section indicating lines 5—5 of FIG. 1 and shows in detail the wrapping of the plastic ribbon about the second mandrel.

Referring now to FIG. 5, the hose at the point of winding over mandrels 15 and 17 is shown as an elongated, slightly twisted, loop as it appears after the ribbon 14 has initially made a single quarter turn over the first mandrel and passed a half turn over the second mandrel and again over the first mandrel to form a complete continuous loop. The pressure roller 23 presses the first few complete windings of the ribbon 14 against the collar 15a on the first mandrel 15, thus providing a smooth uniform wall thickness to the hose as it is wound.

If desired, a water spray (not shown) may be provided for rapid cooling of the hose immediately subsequent to the point of winding over the mandrels.

Figure 6:
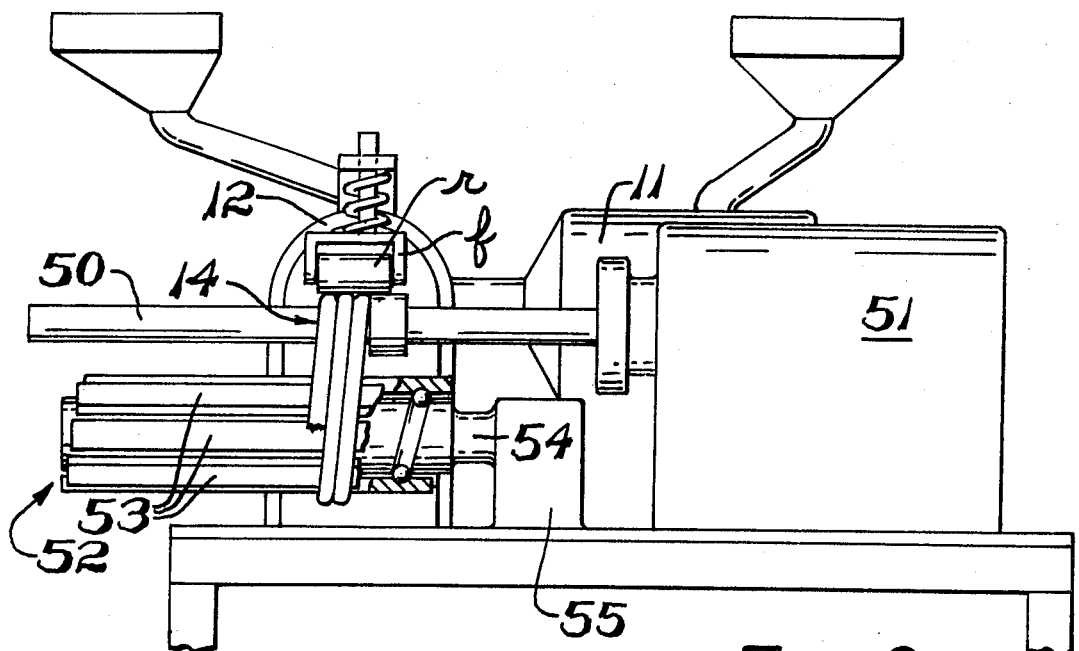
FIG. 6 is a side elevational view of an alternative apparatus for practicing the invention, this apparatus comprising spaced parallel mandrels.

Referring now to FIG. 6, an alternative apparatus for making plastic hose in accordance with the method of this invention effects the winding of the plastic ribbon 14 from die 12 over two spaced, parallel, rotating mandrels. In this embodiment, the first mandrel 50, similar to mandrel 15 of FIGS. 1 and 2, is rotated by power means 51. The second mandrel 52 is free to rotate and has a plurality of longitudinally disposed axially reciprocating slats 53 which serve to feed the hose axially away from the point of winding. The first mandrel 50 is preferably in the range of ten hose diameters in length, whereas the second mandrel 52 is preferably only in the range of four hose diameters in length. A pressure roller r supported rotatably by a fork f is also provided, similar to the embodiment of FIGS. 1 and 2.

Referring now to FIGS. 6 and 7, the mandrel 52 is shown with the slats 53 partially broken away to expose the internal mechanism. A rigid shaft 54 extends from one end of the mandrel and is detachably mounted horizontally in cantilever from support 55 (see FIG. 6) in a manner preventing rotation of the shaft 54. A pair of sleeve blocks 56 assembled over the shaft 54 in a slip fitting arrangement permit rotation of the sleeve blocks about the shaft 54. Retaining collars 58, placed one adjacent each axial end of the sleeve blocks, are secured to the shaft for retaining the sleeve blocks thereon. The collars 58 may be either pressed on the shaft 54 or secured by separate fasteners, as for example, set screws. The outer periphery of each of the sleeve blocks has a plurality of axial lands 56a, preferably T-shaped in cross section, formed therein for retaining and guiding the oscillation of the slats during rotation of the slats and sleeve blocks about the shaft. Each slat 53 has a mating longitudinal groove 53a formed on the radially inner surface thereon for engaging the lands 56a on the sleeve blocks. In the illustrative embodiment, the lands 56a on the sleeve blocks are T-shaped for retaining the slats 53 radially on the sleeve block;

however, in the alternative, the lands 56a may be dovetailed or of other suitable configuration in cross section. The slats 53 are assembled to the sleeve blocks by axially sliding each of the slats over the sleeve blocks 56 with the groove 53a in the slat engaging a corresponding mating land 56a in each sleeve block 56.

A cam block 57, cylindrical in shape, is rigidly mounted on shaft 54 such that relative rotation between the block 57 and shaft 54 is prevented and the block is spaced closely adjacent the sleeve block 56 nearest the end of shaft 54 attached to the support 55. In the present embodiment of the invention, the cam block 57 and the shaft 54 have a common cross-hole 59 and the cam block is secured to the shaft 54 by a roll-pin 60 pressed into the hole for securing the cam block onto the shaft. The cam block 57 has a cam surface 57a formed on the outer surface thereof. A cam follower 61 is provided on the radially inner surface of each slat by separate fastening means 62 and each follower 61 operatively engages the cam surface 57a. In the presently preferred form, the cam surface is a continuous groove in cam block 57 and each follower 62 is a roller bearing assembly with the inner race of the bearing fastened to each slat by fastening means 62. The cam followers are usually positioned in engagement with the cam before the slats are assembled axially over the cam block 57 and then the fastening means 62, as for example counter-sunk machine screws, installed through each slat 53 from the radially outer surface thereof to engage and secure the cam follower 62.

The cam surface 57a is formed such that upon rotation of the slats 53 and sleeve blocks 56 about the shaft 54, each adjacent slat sequentially travels its maximum axial displacement during the initial 180° of rotation about shaft 54. Rotation of the slats through a subsequent 180° about the shaft sequentially returns each adjacent slat io its initial position. In the present practice of the invention, the cam surface 57a is so shaped as to provide quick-return of the slats from the point of maximum axial displacement to their initial position during subsequent rotation of the mandrel through an amount less than 180°. Each slat thus makes one complete axial excursion and returns to its starting position during one revolution of the mandrel 52.

The slats of the mandrel 52 are caused to rotate about shaft 54 by virtue of the ribbon of plastic wrapped around the slats which ribbon is wound by the power-driven first mandrel 50. As the slats rotate, the cam surface 57a causes them to oscillate axially, thereby advancing the ribbon winding to form a tube. As in the embodiment of FIGS. 1 and 2, the diameter of the hose is controlled by the spacing of the mandrels 50 and 52 with respect to each other.

Although the preferred embodiment of the invention has been shown and described in which an extruded ribbon of plastic is fed initially to the winding mandrels, it will be understood that the ribbon may be supplied from different sources, as for example calendar rolls.

It will further be understood that the invention is capable of modifications and adaptations by those having ordinary skill in the art and is more particularly defined by the appended claims.

I claim:

1. An apparatus for making continuous flexible plastic tubing comprising:
   a. means for supplying a single continuous ribbon of heated plastic material having a core of greater stiffness encased therein;
   b. a first rotatable mandrel means disposed with its axis o rotation substantially perpendicular to the direction of supply of said ribbon onto its periphery;
   c. a second rotatable mandrel means spaced from said first mandrel means and adapted to receive said ribbon thereover in a helical coil;
   d. means engaging said coil and exerting pressure thereon to axially unite adjacent pitches of the ribbon into a longitudinally continuous relationship;
   e. means for exerting a force on only the inner periphery of said coil to advance said coil axially over said mandrels including drive means operatively connected to only said first mandrel means for rotating it about its axis.

2. The apparatus defined in claim 1, wherein said second mandrel is disposed in skewed arrangement with said first mandrel.

3. The apparatus defined in claim 1, wherein said means engaging said coil is a cylindrical pressure roller spaced closely adjacent said first mandrel means for pressing said ribbon as it passes over said first mandrel.

4. The apparatus defined in claim 1 further comprising a support means axially spaced from said first mandrel and exerting a supporting force on the exterior thereof as it advances axially from the ends of said mandrels.

5. The apparatus defined in claim 1, wherein said first mandrel has its length not greater than 10 diameters of the tubing and said second mandrel has its length not greater than four diameters of said tubing.

6. The apparatus defined in claim 1, wherein said second mandrel is parallel to said first mandrel and comprises coil-engaging means thereon cyclically movable axially thereof.

7. The apparatus defined in claim 6, wherein the said coil-engaging means comprises a plurality of slats disposed in axially parallel arrangement about the periphery of said second mandrel, and means for oscillating said slats axially for advancing said tubing along said mandrels.

8. The apparatus defined in claim 1, wherein said second mandrel has a cam formed thereon and each slat has a cam follower operatively connected to said cam for sequentially oscillating said slats as said second mandrel is rotated.

9. The apparatus defined in claim 8, wherein said cam has a cyclic period of one revolution and each of said slats is subjected to maximum axial displacement upon one-half revolution thereof.

10. The apparatus defined in claim 9, wherein said cam is shaped for quick return of each slat to its initial position after each slat has reached its maximum axial displacement.

11. An apparatus for making continuous flexible plastic tubing comprising:
   a. at least two extruders;
   b. a common die connected to said extruders and adapted to pass a single continuous ribbon of heated plastic material therethrough, said material having at least two continuous longitudinal portions in continuous adjacent contact which portions have compositions of different stiffness;

c. a first rotatable mandrel means disposed with its axis of rotation substantially perpendicular to the direction of extrusion from said die for receiving said ribbon;
d. a second rotatable mandrel means spaced from said first mandrel means and disposed in skewed arrangement thereto, said mandrels being adapted to receive said ribbon thereover in a helical coil;
e. means engaging said coil and exerting pressure thereon to unit adjacent pitches of the ribbon into a longitudinally continuous relationship; and
f. drive means operatively connected to only said first mandrel means for rotating same about its axis and thereby axially advancing said coil to form a tube.

12. The apparatus defined in claim 11, wherein said means engaging said coil is a pressure roller spaced closely adjacent said first mandrel for pressing said ribbon as it passes over said first mandrel.

13. The apparatus defined in claim 12 further comprising a support means axially spaced from said first mandrel and exerting a supporting force on the exterior of said tubing as it advances axially from the ends of said mandrels.

14. The apparatus defined in claim 12, wherein said first mandrel has its length not greater than 10 diameters of tubing and said second mandrel has its length not greater than four diameters of said tubing.

* * * * *